M. M. JONES.

Cotton-Presses.

No. 5,319. Reissued March 11, 1873.

Witnesses.
C. A. Brown
Melville Church

Inventor.
M. M. Jones.
by his Attys.
Hill & Ellsworth.

AM. PHOTO-LITHOGRAPHIC CO. N.Y. (OSBORNE'S PROCESS)

UNITED STATES PATENT OFFICE.

MORAH M. JONES, OF MORRISVILLE, NEW YORK.

IMPROVEMENT IN COTTON-PRESSES.

Specification forming part of Letters Patent No. 28,281, dated May 15, 1860; reissue No. 5,319, dated March 11, 1873.

*To all whom it may concern:*

Be it known that I, MORAH M. JONES, of Morrisville, in the county of Madison and State of New York, have invented a new and Improved Cotton-Press; and I do hereby declare the following to be a full and exact description of the same, reference being had to the accompanying drawing forming part of this specification, in which—

Figure 1:
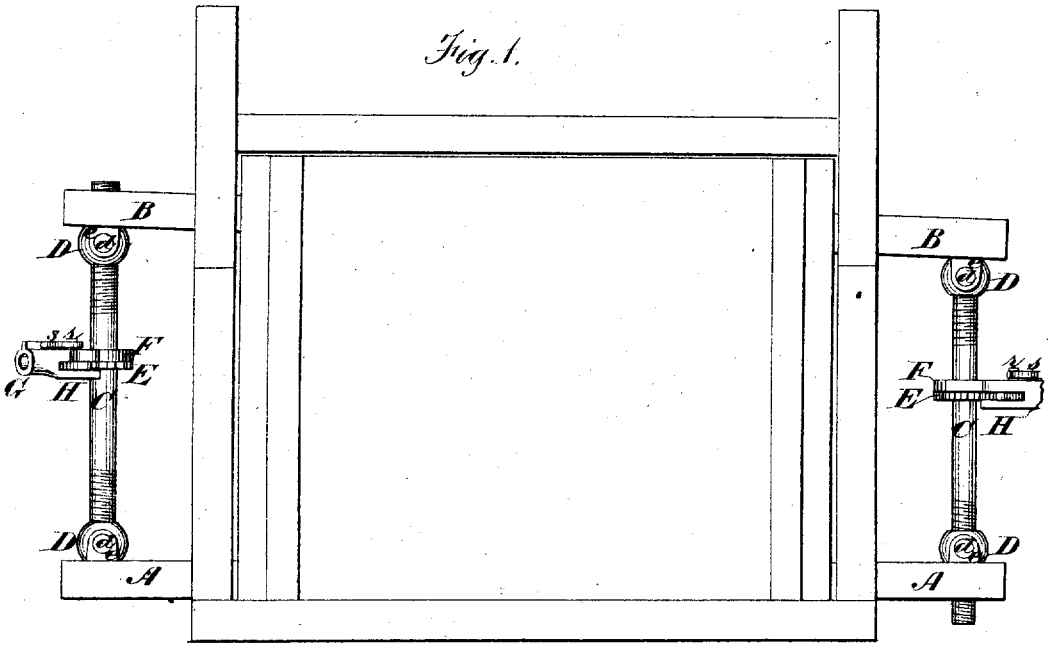
Figure 2:
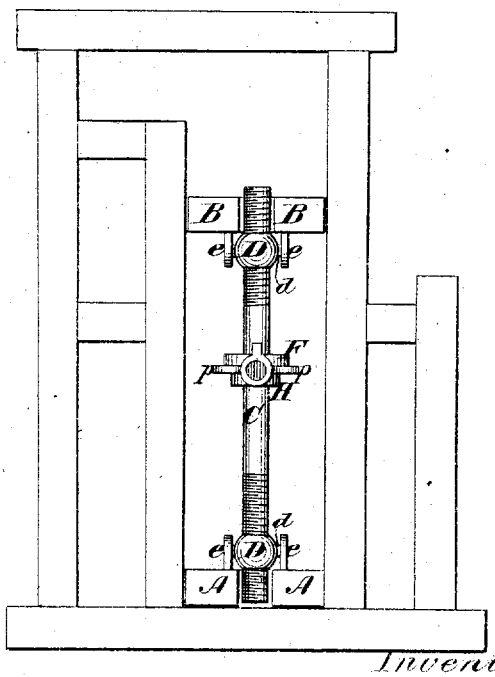
Figure 3:
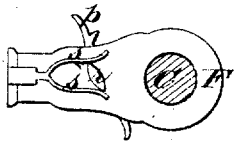
Figure 4:
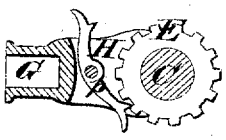

Figure 1 is a side elevation of the press; Fig. 2, an end view; Fig. 3, a top view of the collar F and socket; and Fig. 4, a horizontal section, showing the plate H and ratchet E.

Similar letters of reference in the accompanying drawing denote the same parts.

This invention belongs to that class of cotton-presses in which right-and-left screws are used to work the follower. The invention has for its object to improve the construction of a cotton-press of this class in such manner that if the follower becomes inclined lengthwise in ascending or descending it will not thereby distort the nuts or bend the screws, and thus impede the working of the follower. To this end the invention consists in the construction and combination of the parts, which I will now proceed to describe.

The press-box and frame are of ordinary construction. A is the bed-piece resting on the sills of the press. B is the follower. The ends of both the bed-piece and follower project beyond the box, and are notched longitudinally. C are the screws, each with a right-and-left thread, passing through the notches in the follower and bed-piece. D are the nuts, through which the screws pass, four to each press, two connected with the ends of the follower and two with the ends of the bed-piece. These nuts are constructed with trunnions *d*, which enter lugs *e*, attached to the under side of the follower and to the upper side of the bed-piece, one leg at each side of each of the aforesaid notches.

On turning the screws the follower is raised or lowered and twice as fast as though the threads ran all in the same direction. I do not, however, claim the application of a right-and-left screw to a cotton-press.

As it is difficult to turn both screws with exactly the same rapidity the follower is very liable to become inclined as it moves upward or downward.

By this method of connection herein described the follower is allowed to incline without thereby distorting the nuts or bending the screws.

At the middle of each screw is fixed a circular ratchet, E, and resting upon each ratchet is a collar, F, loosely inclosing the screw. The socket G, for the insertion of the lever which turns the screw, is attached to one side of the collar F, and from said socket a plate, H, projects beneath the ratchet toward the screw at a sufficient interval from the collar to receive a double pawl, *p*, between said plate and collar. This pawl is fixed on a pin that passes loosely through the collar F and is stepped in the plate H. The pin has an elongated head, *r*, against the opposite ends of which bear the free ends of two spring-plates, *s s*, the other ends of which are made fast to the upper side of the socket G. When one part of the pawl engages with the ratchet E the other part is separate from it.

When it is desired to reverse the motion of the screw, the pawl that was before separate from the ratchet is brought into contact with it. The springs *s* permit the pawl to slip over the ratchet while the lever is moving back for a fresh hold, and at the same time keep the pawl in contact with the ratchet while slipping back.

Having thus described my invention, what I claim as new is—

1. The combination, with the follower of a press, of screws passing through nuts jointed to the follower, substantially as and for the purpose specified.

2. The combination, with the bed-piece of a press, of screws passing through nuts jointed to the bed-piece, substantially as and for the purpose described.

MORAH M. JONES.

Witnesses:
LUCIUS P. CLARK,
CHARLES M. GRANNIS.